(12) United States Patent
Sharma et al.

(10) Patent No.: US 12,470,366 B2
(45) Date of Patent: Nov. 11, 2025

(54) SECURE REMOTE SUPPORT FOR EDGE COMPUTING PLATFORM

(71) Applicant: Dell Products L.P., Round Rock, TX (US)

(72) Inventors: Anurag Sharma, Cedar Park, TX (US); Daniel E. Cummins, Hudson, NH (US); Michael Emery Brown, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 171 days.

(21) Appl. No.: 17/877,547

(22) Filed: Jul. 29, 2022

(65) Prior Publication Data
US 2024/0039706 A1    Feb. 1, 2024

(51) Int. Cl.
*H04L 9/08* (2006.01)
*H04L 9/32* (2006.01)

(52) U.S. Cl.
CPC ............ *H04L 9/0825* (2013.01); *H04L 9/085* (2013.01); *H04L 9/3247* (2013.01)

(58) Field of Classification Search
CPC ..... H04L 9/0825; H04L 9/085; H04L 9/3247; H04L 9/3265
See application file for complete search history.

(56) References Cited

U.S. PATENT DOCUMENTS

| | | | |
|---|---|---|---|
| 2006/0206712 A1* | 9/2006 | Dillaway | H04L 9/3247 713/176 |
| 2009/0113530 A1* | 4/2009 | Brainard | G06F 21/31 726/5 |
| 2015/0256345 A1* | 9/2015 | Vaid | H04L 9/3268 713/158 |
| 2019/0173890 A1* | 6/2019 | Deka | H04L 9/3247 |
| 2020/0327231 A1* | 10/2020 | Smith | G06F 21/33 |
| 2021/0272108 A1* | 9/2021 | Jing | H04L 9/3247 |
| 2022/0032181 A1* | 2/2022 | Somadder | A63F 13/327 |
| 2022/0038281 A1* | 2/2022 | King | H04L 9/3247 |
| 2023/0396417 A1* | 12/2023 | Junk | H04L 9/3247 |
| 2024/0039706 A1* | 2/2024 | Sharma | H04L 9/3247 |

* cited by examiner

*Primary Examiner* — Richard G Keehn
(74) *Attorney, Agent, or Firm* — Jackson Walker L.L.P.

(57) ABSTRACT

A disclosed method for providing a non-credentialed user (NCU) with secure access to a remote endpoint of an edge computing platform, generates a support voucher for the NCU wherein the support voucher comprises a temporary ownership voucher including one or more digital signatures establishing a chain of trust from a root of trust to the NCU. The method provides a private key associated with the support voucher to the NCU. Responsive to detecting the NCU, using the private key to log into an edge platform resource and determining that the support voucher is recognized by the edge platform resource, the NCU is authenticated and the support voucher is validated to establish the NCU as a designated owner of the remote endpoint. Responsive to establishing the NCU as a designated owner, the NCU may access the edge platform resource and from there access the platform endpoint.

18 Claims, 5 Drawing Sheets

SECURE REMOTE SUPPORT FOR EDGE COMPUTING PLATFORM

TECHNICAL FIELD

The present disclosure relates to edge computing and, more specifically, remote access to platform endpoints.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be deployed in a hierarchical, multi-layer edge computing platform, sometimes referred as an edge estate. An example edge estate might have four edge layers including: site, regional, core data center (DC) and cloud or apex. Each site has one edge orchestrator (EO), which can manage hundreds of edge compute endpoints (ECEs). A regional EO can manage multiple edge sites, a core data center EO can manage multiple regions, and a cloud EO can manage multiple core data centers.

Each level in the hierarchy may include external compute fabrics (ECFs), e.g., VxRail, PowerStore, vSphere Cluster, Kubernetes clusters. Frequently, the ECE runtime is designed to run container and virtual machine (VM) workloads.

Although an ECE is fully managed by an EO and may provide a web console for local management, ECEs are highly secure, closed systems with no shell access to the operating system (OS), e.g., to interact with the device for any troubleshooting or support. Accordingly, ECEs can present certain manageability and accessibility challenges including how to: securely get a secure shell (SSH) session to the device from a web console without opening port 22, securely access applications running in ECE, e.g., Postgres database from a service laptop or EO web interface, securely access iDRAC web interface from EO or service laptop remotely, and securely do listed operations from any of the connected EOs at regional, core DC, and Cloud layers.

Previous approaches to providing secure access have run a jumpbox in the core DC to enable remote debugging/support of servers in a private network or provide non-root user shell access to a host OS, but these practices violate edge strategies including: Zero-IT, Zero-Touch, Zero-Trust.

SUMMARY

In accordance with subject matter disclosed in the following description, disclosed methods and systems for providing a non-credentialed user (NCU) with secure access to a remote endpoint of an edge computing platform, generate a support voucher for the NCU wherein the support voucher comprises a temporary ownership voucher including one or more digital signatures establishing a chain of trust from a root of trust to the NCU, and provide a private key associated with the support voucher to the NCU. Responsive to detecting the NCU, using the private key to log into an edge platform resource and determining that the support voucher is recognized by the edge platform resource, authenticating the NCU, and validating the support voucher to establish the NCU as a designated owner of the remote endpoint. Responsive to establishing the NCU as a designated owner, granting the NCU access to the edge platform resource and wherein the edge platform resource includes a tool to access the platform endpoint. The platform endpoint may be an ECE or ECF. The edge platform resource may be the platform endpoint, e.g., ECE or ECF, a site EO that owns the endpoint, or a higher level EO.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Exemplary embodiments and their advantages are best understood by reference to FIGS. 1-6, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Figure 1:
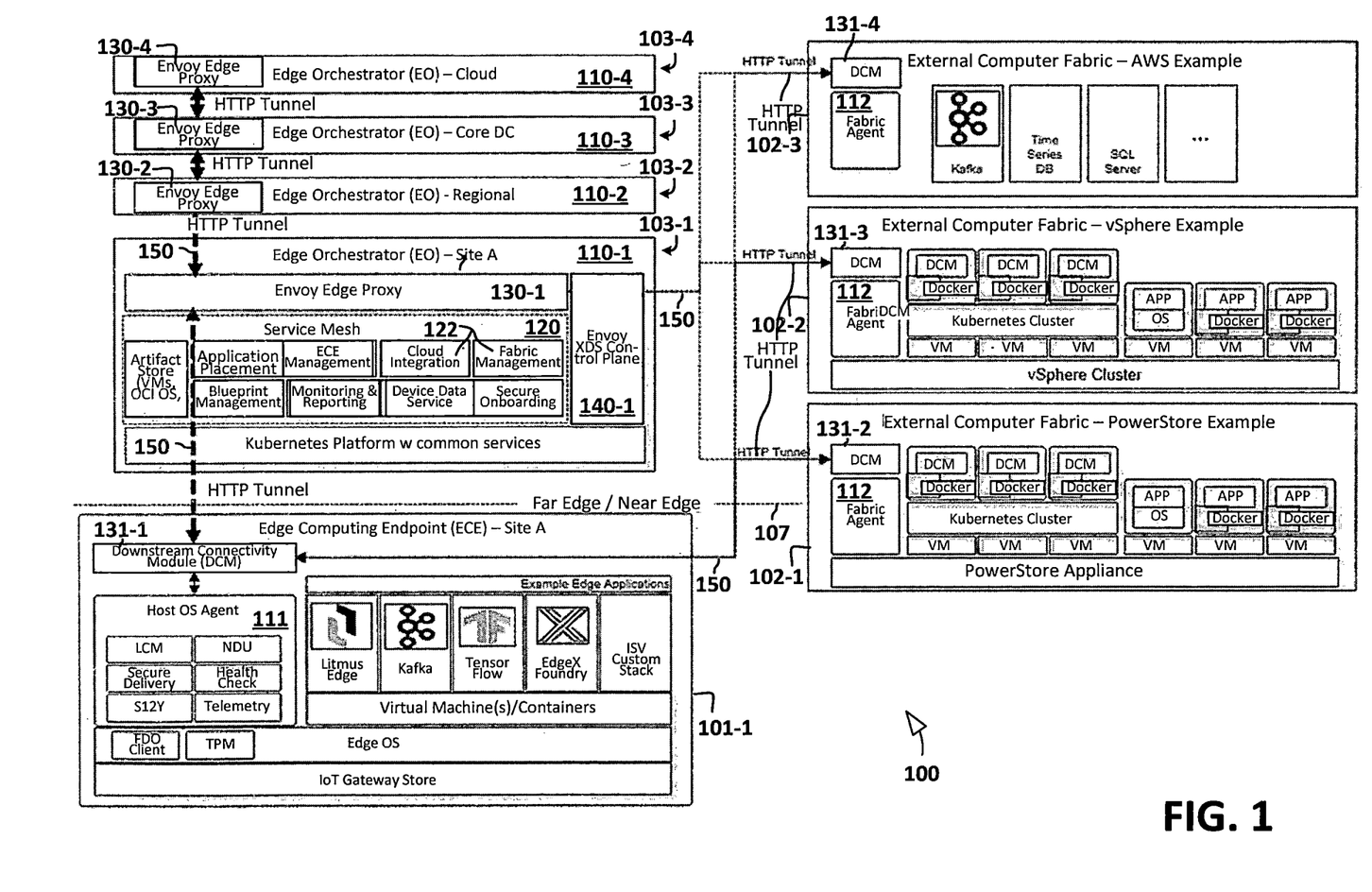
FIG. 1 illustrates an example edge estate in accordance with disclosed subject matter.

Referring now to the drawings, FIG. 1 illustrates an exemplary edge computing platform 100 in which disclosed teachings may be applied. The depicted platform 100 includes a group of hierarchically arranged edges 103, each of which includes an EO 110. The edges depicted in FIG. 1 including a site edge 103-1, a regional edge 103-2, a data center edge 103-4, and a cloud edge 103-4.

In accordance with hierarchal arrangement of EOs 110, the regional EO 110-2 of regional edge 103-2 may manage one or more site edges 103-1, the data center EO 110-3 of data center edge 103-3 may manage one or more regions edges 103-2, and so forth.

Each EO 110 may include a service mesh 120, an edge proxy 130, and an edge control plane 140. For the sake of clarity, FIG. 1 omits the service mesh 120 and control plane 140 from all of the depicted EOs except site EO 110-1.

In at least some embodiments, the service meshes 120, edge proxies 130, and control planes 140 illustrated in FIG. 1 embody an Istio service mesh and, for the sake of brevity and clarity, this detailed description may refer primarily or exclusively to Istio-based implementations, but all such references are illustrative rather than limiting.

The illustrated service mesh 120 of site EO 110-1 encompasses various services 122, each of which may be paired with a corresponding Envoy proxy (not depicted in FIG. 1), sometimes referred to as a sidecar proxy, that couples the applicable service 122 to a communication tunnel, identified in FIG. 1 as HTTP tunnel 150, via edge proxy 130-1. The illustrated HTTP tunnel 150 extends between each pair of architecturally adjacent EOs, i.e., between site EO 110-1 and regional EO 110-2, between regional EO 110-2 and data center EO 110-3, and so forth.

In at least some embodiments, each edge proxy 130 and each network proxy associated with a service 122 may be implemented as an Envoy proxy. Generally, an Envoy proxy is an L7 proxy server and communication bus designed for service-oriented architectures. Each Envoy instance is a self-contained process that enables a corresponding service to exchange messages with a local host. Collectively, Envoy instances form a transparent communication mesh that enables any pair of services to exchange messages without awareness of network topology. An Envoy instance includes an L3/L4 proxy with filter chain mechanism to allow TCP Proxy, UDP Proxy, HTTP Proxy, TLS Client Certificate Authentication, etc., as well as an additional HTTP L7 filter layer for buffering, rate limiting, routing/forwarding, etc. Envoy proxies feature an L7 routing subsystem that supports routing and redirecting requests based on path, authority, content type, runtime values, etc. In addition, Envoy instances may implement advanced load balancing techniques including automatic retries, circuit breaking, rate limiting, request shadowing, and outlier detection. Optionally, an Envoy proxy may consume a layered set of dynamic configuration APIs for centralized management.

Each edge control plane 140 may feature automatic sidecar management with certificate/mTLS configuration for service-to-service communication. In addition, edge control plane 140 may include or support one or more Istio discovery APIs, generally referred to as xDS APIs, that implement an Istio control plane. In such embodiments, the xDS APIs may include a listener discover service (LDS), cluster discovery service (CDS), route discovery service (RDS), endpoint discovery service (EDS), etc.

FIG. 1 illustrates HTTP tunnel 150 extending between site edge proxy 130-1 and downstream connectivity modules (DCMs) 131 provisioned within each of one or more heterogeneous platform endpoints include one or more ECEs 101 and one or more ECFs 102. Generally, the DCMs 131 illustrated in FIG. 1 beneficially enable and support the extension of HTTP tunnel 150 beyond the near edge boundary 107 to platform endpoints 101, 102 so that endpoint resources may communicate securely with near edge services, i.e., all services associated with edges 103-1 through 103-4, in the same way or substantially the same way that the near edge services communicate with each other.

The endpoints 101, 102 illustrated in FIG. 1 include an ECE 101-1 and three illustrative ECFs 102 including a PowerStore ECF 102-1, a vSphere ECF 102-2, and an Amazon ECF 102-3. Those of ordinary skill in the field will recognize the depicted deployment as exemplary and will readily appreciate that platform 100 may include more, fewer, and/or different endpoints. Each DCM 131 depicted in FIG. 1 is coupled to an agent resource of the applicable endpoint. Thus, DCM 131 of ECE 101-1 is communicatively coupled to a host OS agent 111 while the DCMs 131 within each ECF 102 are communicatively coupled to a corresponding fabric agent 112.

Figure 2:
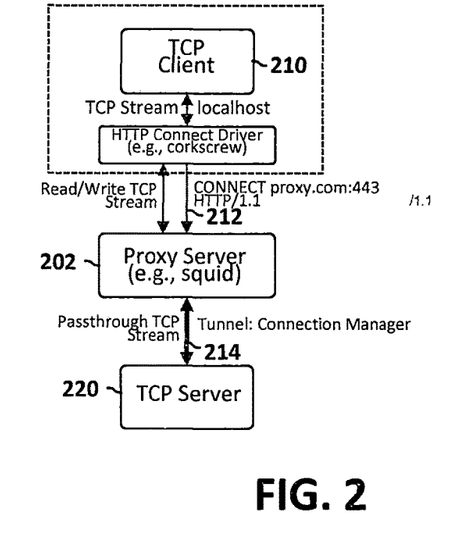
FIG. 2 illustrates a proxy server performing proxy operations in accordance with disclosed teachings.

FIG. 2 illustrates use of an HTTP CONNECT method to create an HTTP tunnel through a proxy server 202. TCP client 210 sends an HTTP CONNECT request 212 to ask proxy server 202 to forward the TCP connection to the desired destination, TCP server 220. Proxy server 202 establishes a connection 214 with the TCP server 220 on behalf of TCP client 210, and after the connection is established, proxy server 202 continues to proxy the TCP stream to and from TCP client 210. In this exchange, only the initial connection request is HTTP—after that, proxy server 202 simply proxies the established TCP connection.

Some proxies may require authentication. If so, the client must provide the authentication details in the Proxy-Authorization header. In case the proxy server encounters an error like DNS resolve failure or connect timeout, it returns an error code to the client.

Figure 3:
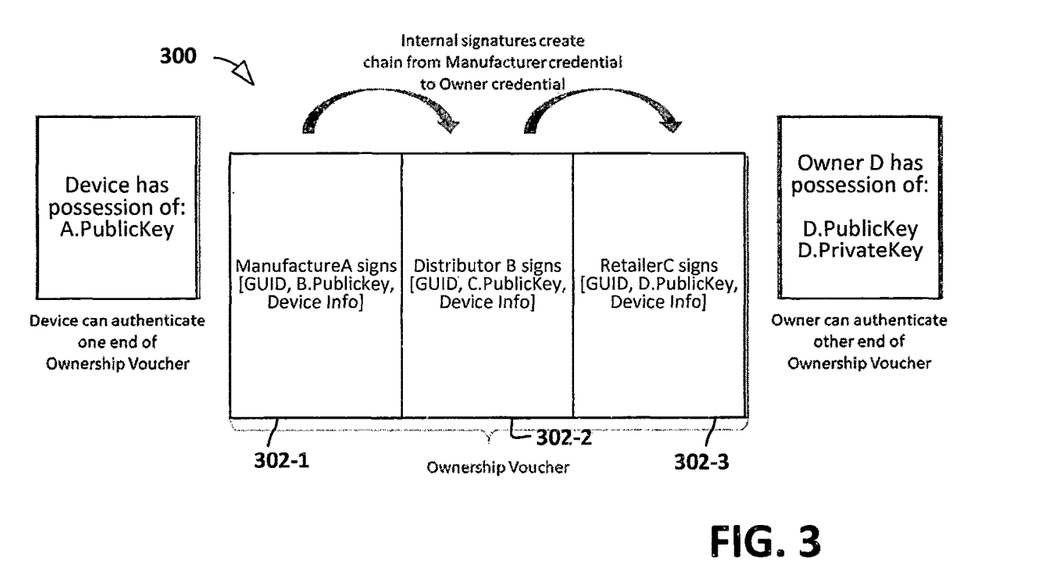
FIG. 3 illustrates an ownership certificate in accordance with disclosed teachings.

FIG. 3 illustrates an exemplary ownership voucher 300 suitable for use in providing secure, remote access to edge estate resources as disclosed herein. The illustrated ownership voucher 300 is a structured digital document including a chain of signed public keys 302 that links a device manufacturer with the device's owner.

Each signature of a public key authorizes the possessor of the corresponding private key to take ownership of the device or pass ownership through another link in the chain.

Voucher signing A trusted execution environment (TEE) may be initialized with a hash of a manufacturer public key. An owner's public key is encoded and signed using the manufacturer private key and the voucher is updated.

1st Owner to transfer ownership to 2nd Owner Encode 2nd owner's public key and sign using 1st owner private key and update voucher.

Voucher Verification Process
   Owner: Sign a nonce using private key
   Owner: Send voucher+signature to Device
   Device: Verify nonce using owner's public key→owner has private key
   Device: Get manufacturer public key (1st entry) from voucher
   Device: Verify the hash of manufacturer public key stored in its TEE
   Device: Verify the signatures of the Ownership Voucher in sequence, until it comes to owner's public key (last entry)→the chain of ownership is trusted Turning now to FIG. 4, an illustrated edge estate architecture 400 supports secure remote access to platform endpoints including ECEs and ECFs. In at least some embodiments, the illustrated architecture employs an Istio service mesh customized based on an edge estate database (not depicted in FIG. 4) of endpoints for authorization and routing. The illustrated architecture 400 includes an ECE 410 and a site EO 420. The illustrated ECE 400 is provisioned with a DCM 412 by EO 420 and configured with proxy configuration including service registry, DNS cache and routes.

Figure 4:
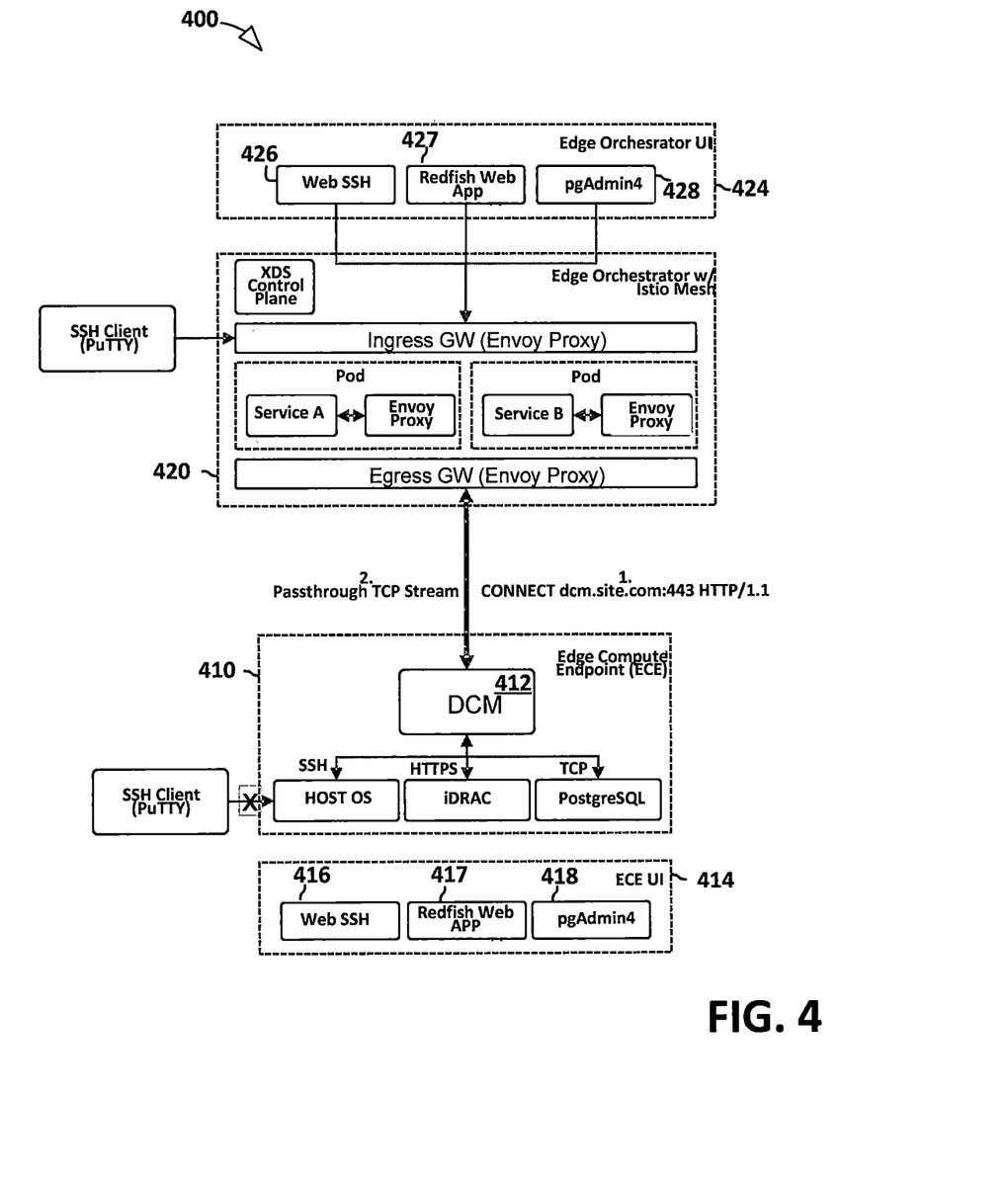
FIG. 4 illustrates an architecture for secure remote access to a platform endpoint in accordance with disclosed teachings.

Ownership Voucher as CA certificate Site level EO 420 managing an ECE 410 has an Ownership Voucher (OV) containing a public key of EO 420. Regional or higher level EOs (not depicted) may register lower level EOs, including site EO 420, for delegation using FIDO password-less strong authentication. During registration, a lower level EO generates an OV using FIDO ownership transfer protocol. Regional or higher level EOs receive the OV containing their public key signed by a lower level EO. Any certificate signed by an OV should be trusted by a DCM.

Edge estate database As part of onboarding and registration flow, an EO has access to a fully qualified domain name (FQDN) and an IP address of each ECE and ECF it manages. Each higher level EO has the FQDN and the IP address of the connected EO. Site level EO 420 has an inventory of services running at ECEs including ECE 410. Higher level EOs have an inventory of services running at connected EO. DNS records are synchronized across edge estate via service mesh XDS configuration. This requires creating a Service Entry, a Destination Rule and Gateway CRD in the mesh for external services.

Proxy Configuration The service mesh at site level EO 420 is configured to route external traffic to DCM 412 and higher level EO is configured to route external traffic to connected EO. This requires creating a TCP Service Entry customer resource definition (CRD) in the mesh for the DCM or connected EO.

EO Web User/Interface (UI)

The site EO 420 contains web UI 424 providing support apps like Web SSH 426, iDRAC Interface 427, pgAdmin4 (428), etc., that enables IT admin to switch to any managed ECE for troubleshooting. IT admin can also use external tools including an SSH client, e.g., PuTTY and configure EO as a proxy server.

ECE Web Console ECE 410 exposes a web console 414 for individually accessing Web SSH 416, iDRAC via Redfish Web App 417, or databases via pgAdmin4 418 for troubleshooting when disconnected from the owner EO 420. As indicated previously, ECE 410 is a closed box that does not provide direct access to host via SSH tools like PuTTY. IT Admins must use web console 414.

Figure 5:
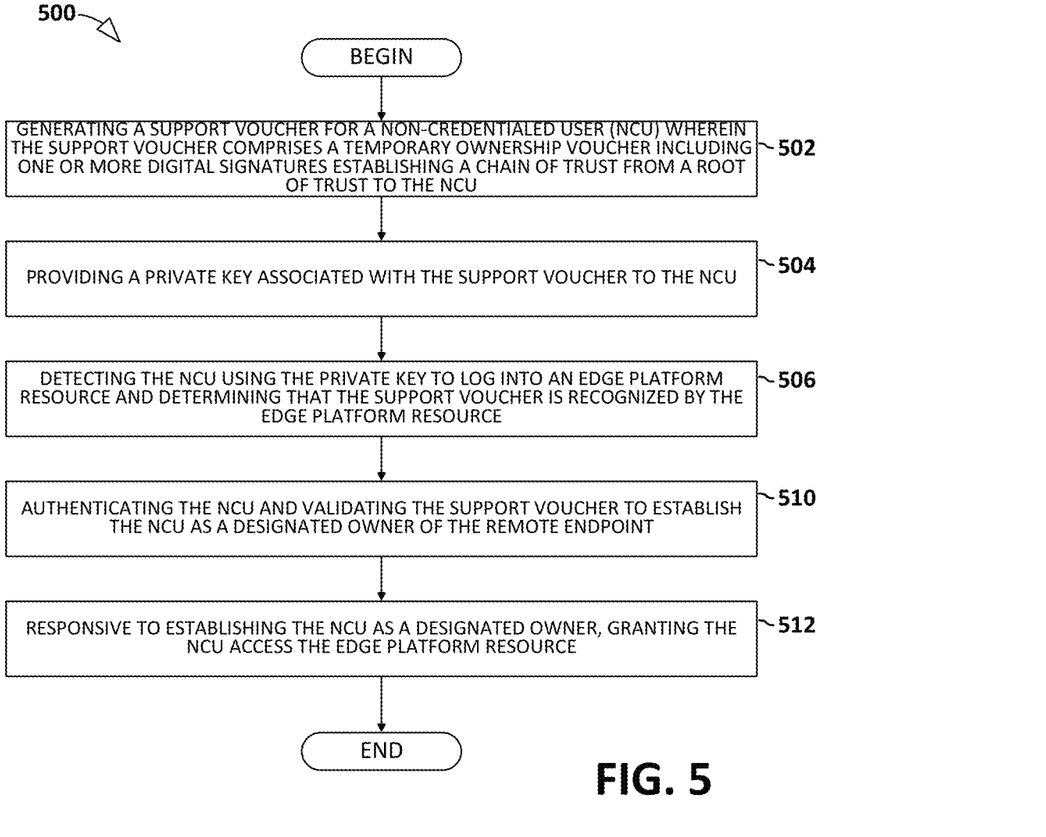
FIG. 5 illustrates a method for providing secure access to edge platform endpoints in accordance with disclosed teachings.

Turning now to FIG. 5, a flow diagram illustrates a secure remote access method 500 in accordance with disclosed teachings. The method 500 illustrated in FIG. 5 encompasses various remote access use cases including: remote access from the registered owner EO such as the site EO 420 of FIG. 4, remote access from ECE 410 to provide field support for ECEs and ECFs disconnected from the site EOs, and delegated access from a higher level EO.

The method 500 of FIG. 5 includes generating (step 502) a support voucher for a non-credentialed user (NCU) such as a product support engineer (PSU). The support voucher comprises a temporary ownership voucher including one or more digital signatures establishing a chain of trust from a root of trust to the NCU. As depicted in FIG. 5, method 500 then provides (504) a private key associated with the support voucher. Upon subsequently detecting (step 506) the NCU using the private key to log into an edge platform resource, e.g., site EO or ECE, and determining that the support voucher is recognized by the edge platform resource, the illustrated method may then authenticate (step 510) the NCU and validate the support voucher to establish the NCU as a designated owner of the remote endpoint. Responsive to establishing the NCU as a designated owner, method 500 may then grant (step 512) the NCU access to the edge platform resource, which includes one or more tools such as the web UIs 414 and 424 of FIG. 4 to access the platform endpoint.

Use case 1 A PSE may not have an account in site EO 420 (the owner EO) but may need to establish an SSH, iDRAC or Postgres session for ECE 410 or one of the many other ECEs. As discussed, ECEs are largely immutable because its resources are largely configured via owner EO and, for security reasons, ECE 410 does not have a concept of local accounts.

Problem PSE needs a secure access to ECE/ECF for a limited time window. EO 420 needs to provide access log of such activities for audit control.

Workflow-Access Setup The EO interface 424 provides an inventory of all managed ECEs with red/yellow/green status indicators. The PSE requests access to a remote ECE/ECF. The customer administrator, using EO interface, generates a support voucher for PSE with a short expiration and signs it using the ECE's Ownership Voucher, which the EO has. The PSE gets private key of the support voucher and logs in to the EO using the private key of the support voucher. After a successful authentication, the PSE uses EO provided interface like Web SSH or other support apps and configures a proxy connection to ECE using Istio Mesh API (if not already done). Gateway, destination rule, virtual service and service entry CRD objects may be created.

The EO configures an authorization filter using Istio Mesh API to leverage support voucher for mTLS with ECE. The EO support app establishes proxy connection to the respective service running at ECE.

The DCM validates client certificate for mTLS as a valid support voucher by traversing through ownership chain of certificates. This proves that the PSE is a designated owner of the device.

Both EO and DCM log this activity into audit database. The support app (like Web SSH) is now connected to the ECE.

Workflow—Revocation of Access After logout or timeout, the EO revokes the support voucher and PSE does not have access to the remote ECE/ECF.

Use case 2 The ECE is disconnected from EO either because of an issue or because ECE is at a distant location out of EO network. PSE needs to be sent onsite for troubleshooting. The ECE provides a web console for secure local access but does not have ability to perform SSO or login via IDP/AD. The PSE may need to get SSH, iDRAC or postgres DB session established to troubleshoot the ECE.

Problem PSE needs a secure access to ECE/ECF for a limited time window. EO interface is not connected to ECE.

Workflow—Access Setup Substantially same as Use Case 01. PSE has the support voucher and its private key. The PSE logs in to ECE web console using the support voucher. The ECE uses DCM to validate the support voucher by traversing through ownership chain of certificates. This proves that the PSE is a designated owner of the device.

Workflow—Remote Access The PSE, after a successful authentication, uses ECE provided interface like Web SSH or other support apps. DCM logs this activity into audit database and later synchronizes with EO when gets connected. The support app (like Web SSH) is now connected to the ECE.

Workflow—Revocation of Access ECE does not persist support voucher. After logout or timeout, the PSE does not have access to the remote ECE.

Use case 3 Edge estate includes a hierarchy of EOs. The PSE may not have an account in EO but may need to get SSH, iDRAC or Postgres DB session established for one of the many ECE.

Problem PSE needs a secure access to ECE/ECF for a limited time window from the nearest EO (e.g. APEX/Cloud EO or a regional EO). EO needs to securely delegate access through a chain of connected EO and provide access log of such activities for audit control.

Workflow—Access Setup The higher level EO interface provides an inventory of all connected EOs with their red/yellow/green status. The PSE requests access (likely asks the customer) to a remote ECE/ECF. The customer admin using EO interface generates a support voucher for PSE. The EO generates support certificate with short expiration and signs it using ECE Ownership Voucher (FDO ownership transfer). This EO performs this action through a series of delegated calls to a chain of connected EOs until it gets to the owner EO of the ECE. The PSE gets private key of the support voucher which is a chain of ownership from owner EO all the way to connected higher EO. The PSE logs in to the nearest EO using the private key of the support voucher.

Workflow—Remote Access The PSE after a successful authentication, uses EO provided interface like Web SSH or other support apps. The EO configures proxy connection to ECE through a chain of delegation to connected EO using Istio Mesh API (if not already done). Gateways, destination rules, virtual services and service entry CRD objects may be created. The EO configures authorization filters through a chain of delegation to connected EO using Istio Mesh API to leverage support voucher for mTLS with ECE. The EO support app establishes proxy connection to the respective service running at ECE. The DCM validates client certificate for mTLS as a valid support voucher by traversing through ownership chain of certificates. This proves that the PSE is a designated owner of the device.

Workflow—Revocation of Access After logout or timeout, the EO revokes the support voucher through a chain of delegation to connected EO and PSE does not have access to the remote ECE/ECF.

Figure 6:
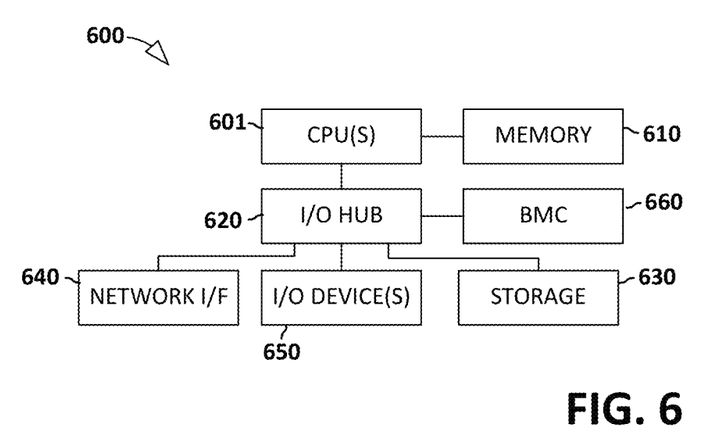
FIG. 6 illustrates an information handling system suitable for used in conjunction with disclosed subject matter.

Referring now to FIG. 6, any one or more of the elements illustrated in FIG. 1 through FIG. 5 may be implemented as or within an information handling system exemplified by the information handling system 600 illustrated in FIG. 6. The illustrated information handling system includes one or more general purpose processors or central processing units (CPUs) 601 communicatively coupled to a memory resource 610 and to an input/output hub 620 to which various I/O resources and/or components are communicatively coupled. The I/O resources explicitly depicted in FIG. 6 include a network interface 640, commonly referred to as a NIC (network interface card), storage resources 630, and additional I/O devices, components, or resources 650 including as non-limiting examples, keyboards, mice, displays, printers, speakers, microphones, etc. The illustrated information handling system 600 includes a baseboard management controller (BMC) 660 providing, among other features and services, an out-of-band management resource which may be coupled to a management server (not depicted). In at least some embodiments, BMC 660 may manage information handling system 600 even when information handling system 600 is powered off or powered to a standby state. BMC 660 may include a processor, memory, an out-of-band network interface separate from and physically isolated from an in-band network interface of information handling system 600, and/or other embedded information handling resources. In certain embodiments, BMC 660 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method for providing a non-credentialed user (NCU) with secure access to a remote endpoint of an edge computing platform, where the method includes:
   generating a support voucher for the NCU wherein the support voucher comprises a temporary ownership voucher including one or more digital signatures establishing a chain of trust from a root of trust to the NCU;
   providing a private key associated with the support voucher to the NCU;
   responsive to detecting the NCU using the private key to log into an edge platform resource and determining that the support voucher is recognized by the edge platform resource, authenticating the NCU and validating the support voucher to establish the NCU as a designated owner of the remote endpoint; and
   responsive to establishing the NCU as a designated owner, granting the NCU access to the edge platform resource and wherein the edge platform resource includes a tool to access the platform endpoint.

2. The method of claim 1, wherein the edge platform resource is an edge orchestrator (EO).

3. The method of claim 2, wherein the EO is a registered owner of the remote endpoint.

4. The method of claim 2, wherein the EO is a higher level EO than a registered owner of the remote endpoint.

5. The method of claim 1, wherein the remote endpoint comprises an edge compute endpoint.

6. The method of claim 1, wherein the remote endpoint comprises an external compute fabric.

7. An information handling system, comprising:
   a central processing unit (CPU);
   a computer readable memory including processor executable instructions that, when executed by the CPU, cause the information handling system to perform operations for providing a non-credentialed user (NCU) with secure access to a remote endpoint of an edge computing platform, where the operations include:
   generating a support voucher for the NCU wherein the support voucher comprises a temporary ownership voucher including one or more digital signatures establishing a chain of trust from a root of trust to the NCU;
   providing a private key associated with the support voucher to the NCU;
   responsive to detecting the NCU, using the private key to log into an edge platform resource and determining that the support voucher is recognized by the edge platform resource, authenticating the NCU, and validating the support voucher to establish the NCU as a designated owner of the remote endpoint; and
   responsive to establishing the NCU as a designated owner, granting the NCU access to the edge platform resource and wherein the edge platform resource includes a tool to access the platform endpoint.

8. The information handling system of claim 7, wherein the edge platform resource is an edge orchestrator (EO).

9. The information handling system of claim 8, wherein the EO is a registered owner of the remote endpoint.

10. The information handling system of claim 8, wherein the EO is a higher level EO than a registered owner of the remote endpoint.

11. The information handling system of claim 7, wherein the remote endpoint comprises an edge compute endpoint.

12. The information handling system of claim 7, wherein the remote endpoint comprises an external compute fabric.

13. A non-transitory computer readable medium including processor executable instructions that, when executed by a processor of an information handling system, cause the information handling system to perform operations for providing a non-credentialed user (NCU) with secure access to a remote endpoint of an edge computing platform, where the operations include:
   generating a support voucher for the NCU wherein the support voucher comprises a temporary ownership voucher including one or more digital signatures establishing a chain of trust from a root of trust to the NCU;
   providing a private key associated with the support voucher to the NCU;
   responsive to detecting the NCU, using the private key to log into an edge platform resource and determining that the support voucher is recognized by the edge platform resource, authenticating the NCU, and validating the support voucher to establish the NCU as a designated owner of the remote endpoint; and
   responsive to establishing the NCU as a designated owner, granting the NCU access to the edge platform resource and wherein the edge platform resource includes a tool to access the platform endpoint.

14. The non-transitory computer readable medium of claim 13, wherein the edge platform resource is an edge orchestrator (EO).

15. The non-transitory computer readable medium of claim 14, wherein the EO is a registered owner of the remote endpoint.

16. The non-transitory computer readable medium of claim 14, wherein the EO is a higher level EO than a registered owner of the remote endpoint.

17. The non-transitory computer readable medium of claim 13, wherein the remote endpoint comprises an edge compute endpoint.

18. The non-transitory computer readable medium of claim 13, wherein the remote endpoint comprises an external compute fabric.

* * * * *